United States Patent
Beauchamp, Jr. et al.

[15] 3,699,230
[45] Oct. 17, 1972

[54] DIMETHYLISOSORBIDE SOLVENT FOR MUSCLE RELAXANT DRUGS

[72] Inventors: Robert Owens Beauchamp, Jr.; John Wesley Ward; Bernard Vincent Franko, all of Richmond, Va.

[73] Assignee: A. H. Robins Company Incorporated, Richmond, Va.

[22] Filed: March 12, 1971

[21] Appl. No.: 123,847

[52] U.S. Cl. .................424/272, 424/274, 424/300, 424/358
[51] Int. Cl. ..............................................A61k 27/10
[58] Field of Search...............424/358, 272, 274, 300

[56] References Cited

UNITED STATES PATENTS 3,219,529    11/1965    Nash et al..................424/227

Primary Examiner—Shep K. Rose
Attorney—G. William King and Norman D. Dawson

[57] ABSTRACT

Novel compositions comprising dimethylisosorbide solutions of otherwise difficultly soluble muscle relaxant drugs and their applications are described. Additive synergism of muscle relaxant properties of the solvent and solute is disclosed.

11 Claims, No Drawings

DIMETHYLISOSORBIDE SOLVENT FOR MUSCLE RELAXANT DRUGS

The present invention relates to novel therapeutic compositions and is more particularly concerned with parenteral and oral preparations of muscle relaxant drugs in dimethylisosorbide solvent.

Prior to the present invention, the relative insolubility of certain muscle relaxant drugs has limited their use in parenteral and oral pharmaceutical preparations. Some drugs could not be satisfactorily prepared as parenterals due to the absence of a suitable solvent. Oral preparations of some drugs have been limited because of the unpalatability of slurries. Methocarbamol, which is soluble to the extent of about 10 percent in polyethyleneglycol-300, has had limited use as a parenteral because of the large volumes of solvent required to prepare parenterals containing a satisfactory dose level.

The present invention involves the discovery that dimethylisosorbide is an elegant solvent for muscle relaxant drugs. Furthermore, dimethylisosorbide contributes to the net muscle relaxant effect by additive synergism. Dimethylisosorbide hereinafter referred to as DMI is 1,4:3,6-dianhydro-2,5-di-o-methylglucital.

It is therefore a primary object of the present invention to provide a method of solubilizing muscle relaxant drugs using DMI to obtain soluble parenteral and oral therapeutic preparations. Another object is to provide therapeutic preparations having a lower concentration of the muscle relaxant drugs needed for muscle relaxation due to the additive synergism of the muscle relaxant property of DMI.

Additional objects will become apparent hereinafter and still others will be apparent to one skilled in the art.

By "muscle relaxant drugs" is meant those drugs which are primarily used for their muscle relaxant property and which constitute the solute of the therapeutic preparation. By "additive synergism" is meant that the muscle relaxant drug which is the solute and the solvent DMI both contribute to muscle relaxation, the net effect being no more than that expected from the sum of the two.

Any muscle relaxant drug which is soluble in DMI may be used in the present invention. Among those muscle relaxant drugs which can be used, the preferred drugs are methocarbamol, metaxalone, meprobamate and 1-ethylcarbamoyl-3-(3-trifluoromethylphenyl)pyrrolidine. Methocarbamol is 3-(o-methoxyphenoxy)-2-hydroxypropyl-1-carbamate; metaxalone is 5-(3,5-dimethyl-phenoxymethyl)-2-oxazolidinone and meprobamate is 2-methyl-2-n-propyl-1-3-propanediol dicarbamate.

The solubility of methocarbamol in DMI was found to be 40 g. per 100 ml. The solubility of methocarbamol in water is about 1.5 g. per 100 ml. The solubility of methocarbamol in polyethyleneglycol-300 is about 10 g. per 100 ml. Polyethyleneglycol-300 (hereinafter referred to as PEG-300) has prior to the present invention been the best solvent for methocarbamol. Thus, in practicing the present invention the volume of a parenteral methocarbamol solution may be reduced by a factor of at least four. DMI-water mixtures were also found to be useful solvent vehicles for parenteral and oral preparations containing methocarbamol.

The data which is summarized in Table I were obtained by agitating mixtures of methocarbamol, DMI and water, methocarbamol and water, and methocarbamol and DMI at 30° C. ± 0.1° C. and determining the amount of methocarbamol dissolved. No methocarbamol precipitated from the foregoing solutions on standing at 30° C. or above.

TABLE I

Solubility of Methocarbamol at 30°C. in DMI-Water Mixtures

| Proportions of DMI-$H_2O$ in mls. | | Solubility of methocarbamol (gms.) 100 g. of solution |
|---|---|---|
| DMI | $H_2O$ | |
| 0 | 100 | 1.6 |
| 20 | 80 | 6.6 |
| 40 | 60 | 22.8 |
| 50 | 50 | 33.9 |
| 60 | 40 | over 36.2 (very viscous) |
| 70 | 30 | over 35. " |
| 80 | 20 | over 41. " |
| 90 | 10 | over 39.1 " |
| 100 (note a) | 0 | 21.1 | a. A supersaturated solution containing up to 40 g. of methocarbamol in 100 ml. of DMI can be prepared by warming above 30°C. and cooling the solution to 25°C.

The solubility of metaxalone in water is 0.03 g./100 ml. and 20 g./100 ml. in DMI. The solubility of meprobamate and 1-ethylcarbamoyl-3-(3-trifluoromethylphenyl)pyrrolidine in a solution of 75 volume per cent DMI and 25 volume per cent water is 20 g. per 100 ml. of solution. All of said combinations are useful as vehicles for parenteral and oral preparations.

The parenteral and oral administration of DMI to laboratory animals revealed no toxic effects when given in amounts used in preparing parenteral and oral preparations of the muscle relaxant drugs described hereinabove. No toxic effects were observed upon intravenous injection of the solutions to obtain quick muscle relaxant effect.

The following examples are intended to illustrate the invention described herein without unduly restricting it.

EXAMPLE 1

A solution containing 14.1 g. of metaxalone in 86 ml. of DMI was prepared by stirring while warming slightly and the volume adjusted to 100 ml. with DMI. A slurry consisting of 4.8 g. of metaxalone, 0.5 g. of methylcellulose and 95 ml. of water was prepared and stirred until a smooth suspension was obtained. The muscle relaxing effect of the two preparations and DMI were compared by determining the dosage required to produce loss of righting reflex in 50 percent of the rats tested ($LRRD_{50}$). Three groups of seven rats per group were injected intraperitoneally. The results are summarized in Table II in mg. of metaxalone/kg. body weight and ml. of DMI/kg body weight.

TABLE II

| | Metaxalone mg./kg. | DMI ml./kg. |
|---|---|---|

| | | |
|---|---|---|
| DMI solution of metaxalone | 126 | 0.89 |
| DMI | — | 1.62 |
| Aqueous slurry of metaxalone | 240 | — |

EXAMPLE 2

The solution of Example 1 containing 14.1 g. of metaxalone per 100 ml. of DMI, a solution containing 10 g. of metaxalone per 100 ml. of DMI and DMI were administered separately to dogs by injection into a cephalic vein through an indwelling hypodermic needle. The dogs had been fasted 16 to 18 hours prior to the testing. The rate of injection was approximately 2 to 3 ml./minute. After each dose of 0.25 to 0.5 ml./kg., the injection was interrupted to allow time for determining the condition of the various reflexes. When the righting reflex was lost, the injection was interrupted for about 15 minutes to observe whether the reflex would return. Additional amounts of the drug were administered until complete loss of muscle tone and of the pinna, corneal and withdrawal reflexes occurred. When it appeared that the animal was recovering after 1 hour had elapsed, additional amounts of the drug were administered until death occurred. The data on the reflexes are given in Table III. In vitro data on hemolytic potential are given in Table V.

EXAMPLE 3

The following solutions were prepared by stirring mixtures of methocarbamol and solvent as indicated, the proportions of DMI and water being on a volume basis.

| Solution | Weight Methocarbamol per 100 g. solution | Proportions DMI to water (volume basis) | Proportions PEG–100 to water |
|---|---|---|---|
| A | 10 | 100:0 | |
| B | 40 | 100:0 | |
| C | 15 | 20:80 | |
| D | 40 | 50:50 | |
| E | 10 | | 50:50 |

Mongrel dogs of either sex weighing between 9.2 and 14.5 kg. were used in investigating the effect of the foregoing solutions on certain reflexes and on muscle tone. The animals were fasted for 16 to 18 hours prior to use. The solutions were administered into a cephalic vein through an indwelling hypodermic needle at a rate of 2 to 3 ml./minute. After each dose of 0.25 or 0.5 ml./kg. of body weight, administration was interrupted to allow time for determining condition of the various reflexes. When the righting reflex was lost, administration was interrupted for about 15 minutes to determine whether this reflex would return. Additional solution was then administered until complete loss of muscle tone and of the pinna, corneal and withdrawal reflexes occurred. When it appeared that the animal was recovering or after 1 hour had elapsed, additional solution was administered until death occurred. The data are given in Table IV. The effect of the compounds in DMI solution and of DMI on whole blood hemolysis in vitro are given in Table V.

EXAMPLE 4

A solution of 40 g. of methocarbamol per 100 ml. of solution was prepared in a solvent consisting of 75 percent DMI and 25 percent water. Two mongrel dogs conditioned to the laboratory were repeatedly dosed to loss of righting reflex 5 days a week for a period of two weeks with the foregoing methocarbamol solution. The dogs were given the solution intravenously at a rate of not more than 1 ml. per minute until loss of righting occurred. The dosages required for this are shown in Table VI. Body weights were taken prior to each injection and recorded in Table VII. Serum glutamic oxalacetic transaminase (SGO–T) and serum glumatic-pyruvic transminase (SGP–T) values were determined twice prior to the beginning of the experiment and on days 1, 2, 3, 4, 7, 9 and 11. A modified Reitman-Frankel method was used. The results are given in Table VIII.

EXAMPLE 5

A solution of 20 g. of meprobamate per 100 ml. of solvent was prepared in a solvent mixture consisting of 75 volume per cent DMI and 25 volume per cent water. Using the procedures of Example 4 in testing the solution on dogs, the average amount of meprobamate required to produce loss of righting reflex was 85 mg./kg. body weight. SGO–T values were normal except for one dog on 1 day. The data are given in Tables VI and VIII.

EXAMPLE 6

A solution of 20 g. of 1-ethylcarbamoyl-3-(3-trifluoromethylphenyl)pyrrolidine per 100 ml. of solvent was prepared using a solvent mixture consisting of 75 volume per cent DMI and 25 volume per cent water. Using the procedures of Example 4 in testing the solution on dogs, the average amount of 1-ethylcarbamoyl-3-(3-trifluoromethylphenyl)pyrrolidine required to produce loss of righting reflex was 42 mg./kg. body weight. SGO–T and SGP–T values were normal. The data are given in Tables VI and VIII.

The studies reported in the foregoing examples on repeated intravenous administration of muscle relaxant drugs in DMI-water mixtures and of DMI showed that serum glutamic oxalacetic transaminase and serum glutamic pyruvate transaminase values were within the normal range of 15–50 Reitman-Frankel units. This indicates that DMI and its solutions of muscle relaxant drugs did not upset the metabolism of the animals.

The results of the study on the hemolytic potential as presented in Table V show that DMI did not cause as much hemolysis as PEG–300. Methocarbamol preparations containing 10 percent, 20 percent and 40 percent methocarbamol in 100 percent DMI solution and 50 percent aqueous DMI solution produced less hemolysis than did 10 percent methocarbamol in 50 percent PEG–300.

Impairment of central nervous system function was found to be the most prominent pharmacologic effect of lethal or near lethal doses of DMI in mice, rats, hamsters, guinea pigs and dogs. Neither this effect nor the lethality of DMI was influenced significantly by species, ages or sexes of the animals, or by route of administration.

FORMULATION AND ADMINISTRATION

Effective quantities of any of the foregoing pharmacologically active compounds may be administered to a living animal body in either parenteral or oral form. Advantageously, the compositions for parenteral injection may be formulated as dosage units, each unit being adapted to supply a fixed dose of active ingredient. Obviously, several unit dosage forms may be administered at about the same time. The following are examples of parenteral and oral compositions formed in accordance with this invention.

EXAMPLE 7

Parenteral Formulations.

| Metaxalone Ingredients | |
|---|---|
| Metaxalone | 0.500 g. |
| Dimethylisosorbide | 2.25 g. |
| Preservative, e.g., chlorobutanol | 0.01 g. |

| Methocarbamol Ingredients | |
|---|---|
| Methocarbamol | 1.0 g. |
| Dimethylisosorbide | 1.4 g. |
| Preservative | 0.01 g. |
| Water | 0.4 g. |

EXAMPLE 8

Oral Formulations (1.25 g./tsp.).
Methocarbamol-Syrup

| Ingredients | grams. |
|---|---|
| Glycerine | 70.0 |
| Sodium benzoate | 1.0 |
| Grapefruit Flavor Dodge & Olcott (Conax No. 1971) | 10.0 |
| Grapefruit Flavor FMC (No. 8283) | 5.0 |
| Black Cherry Flavor Dodge & Olcott (No. 5225) | 0.5 |
| Sorbo (Atlas' Chemical sorbitol) | 100.0 |
| Methocarbamol | 240.0 |
| Saccharin | 1.0 |
| Water | 240.0 |
| Dimethylisosorbide | 560.0 |
| Total: | 1227.5 |

The methocarbamol, dimethylisosorbide and water are stirred until the methocarbamol is dissolved. The remainder of ingredients are added with stirring until dissolved.

TABLE III

METAXALONE AND DIMETHYLISOSORBIDE LOSS OF REFLEXES AND MUSCLE TONE IN UNANESTHETIZED DOGS

| | Intravenous Dose Causing Complete Loss of | | | | | | Intravenous Dose Causing Death | |
|---|---|---|---|---|---|---|---|---|
| | Righting reflex | | Other reflexes | | Muscle Tone | | | |
| Treatment | ml/kg(1) | mg/kg | ml/kg(1) | mg/kg | ml/kg(1) | mg/kg | ml/kg(1) | mg/kg |
| Solution 14 g. methaxalone per 100 ml. dimethylisosorbide | 0.5 | 70 | 1.0 | 140 | 1.0 | 140 | 2.0 | 280 |
| Solution 10 g. methaxalone per 10.0 ml. dimethylisosorbide | 0.75 | 75 | 1.25 | 125 | 1.25 | 125 | 3.25 | 325 |
| Dimethylisosorbide | 2.0 | — | 2.0 | — | 20 | — | 5.0 | — |

(1) ml/kg designations refer to vehicle.

TABLE IV

METHOCARBAMOL AND DIMETHYLISOSORBIDE: LOSS OF REFLEXES AND MUSCLE TONE IN UNANESTHETIZED DOGS.

| | Intravenous Dose Causing Complete Loss of | | | | | | Intravenous Dose Causing Death | |
|---|---|---|---|---|---|---|---|---|
| | Righting Reflex | | Other Reflexes | | Muscle Tone | | | |
| | ml/kg(1) | mg/kg | ml/kg(1) | mg/kg | ml/kg(1) | mg/kg | ml/kg(1) | mg/kg |
| Solution A, 10 g. Methocarbamol per 100 ml. dimethylisosorbide solution | 1.5 | 150 | 2.0 | 200 | 2.0 | 200 | 4.5 | 450 |
| Solution B, 40 g. Methocarbamol per 100 ml. dimethylisosorbide solution | 2.0 | — | 2.0 | — | 2.0 | — | 5.0 | — |
| Solution C, 15 g. Methocarbamol per 100 ml. (20 dimethylisosorbide — 80 H2O) solution | 2.0 | 300 | 3.25 | 488 | 3.25 | 488 | 6.75 | 1013 |
| Solution D, 40 g. Methocarbamol per 100 ml. (50 dimethylisosorbide — 50 H$_2$O) solution | 0.75 | 300 | 1.25 | 500 | 1.25 | 500 | 2.75 | 1100 |
| Solution E, 10 g. Methocarbarmol per 100 ml. (50 PEG 300–50 H$_2$O) solution | 3.0 | 300 | 4.0 | 400 | 4.0 | 400 | 8.5 | 850 |

(1) ml/kg designations refer to vehicle.

TABLE V

THE EFFECT OF METHOCARBAMOL, METAXALONE IN DIMETHYLISOSORBIDE ON WHOLE BLOOD HEMOLYSIS

| | | | Solvent | | |
|---|---|---|---|---|---|
| Concentration Compound | Saline Added 0.9 % | Acetic Acid[1] 3% 100% | PEG-300[2] 50% | Dimethylisosorbide[3] 100% | 50% |
| None | 0, 0[4] | 3+,3+ | 3+, 3+ | 0,3+ 2+, + | 0, + |
| None | 0, 0 | | | | |
| Methocarbamol | | | | | |
| 10% | | | 2+,4+ | 0, + | ±, + |
| 20% | | | | +, ± | 0, 0 |
| 40% | | | | +, + | +, + |
| Metaxalone | | | | | |
| 1.25% | | | | | 0, + |
| 2.50% | | | | | 4+,4+ |
| 10.0% | | | | 4+, 4+ | |
| 20.0% | | | | 4+, 4+ | |

[1] Positive control
[2] Polyethylene glycol-300
[3] Dimethyl ether of isosorbide
[4] Represents duplicate determinations on an arbitrary scale of 0 to 4+. (± indicates questionable effect.)

TABLE VI.—EFFECT OF DAILY INTRAVENOUS INJECTIONS OF AQUEOUS DIMETHYLISOSORBIDE SOLUTIONS OF MUSCLE RELAXANTS ON AMOUNTS REQUIRED TO PRODUCE LOSS OF RIGHTING REFLEX

| Treatment | Dog Number | Mg./kg. | | | | | | | | | | |
|---|---|---|---|---|---|---|---|---|---|---|---|---|
| | | 0 day | 1 day | 2 days | 3 days | 4 days | 7 days | 8 days | 9 days | 10 days | 11 days |
| Methocarbamol | 2 | 280 | 272 | 266 | 220 | 232 | 222 | 202 | 212 | 229 | 240 |
| | 3 | 264 | 250 | 230 | 220 | 206 | 232 | 189 | 210 | 228 | 243 |
| Meprobamate | 4 | 152 | 63 | 80 | 86 | 89 | 95 | 79 | 70 | 72 | 93 |
| | 1 | 102 | 86 | 82 | 84 | 79 | 87 | 83 | 67 | 71 | 96 |
| 1-ethylcarbamoyl-3-(3-trifluoromethylphenyl)pyrrolidine | 7 | 44 | 42 | 41 | 44 | 40 | 48 | 48 | 46 | 42 | 48 |
| | 8 | 39 | 32 | 40 | 40 | 40 | 32 | 44 | 44 | 40 | 40 |
| Control dimethylisosorbide | 6 | | | 0.20 | 0.20 | 0.20 | 0.20 | 0.20 | 0.20 | 0.20 | 0.22 |
| Methocarbamol | 5 | 0.70 | 0.68 | 0.53 | 0.54 | 0.55 | 0.57 | 0.57 | 0.58 | 0.58 | 0.59 |
| | 2 | 0.66 | 0.62 | 0.64 | 0.55 | 0.58 | 0.58 | 0.51 | 0.53 | 0.57 | 0.60 |
| | 3 | 0.76 | 0.32 | 0.68 | 0.42 | 0.62 | 0.68 | 0.48 | 0.53 | 0.67 | 0.61 |
| Meprobamate | 4 | 0.51 | 0.43 | 0.41 | 0.43 | 0.45 | 0.47 | 0.40 | 0.35 | 0.36 | 0.46 |
| | 1 | 0.61 | 0.21 | 0.21 | 0.22 | 0.40 | 0.43 | 0.42 | 0.33 | 0.36 | 0.48 |
| 1-ethylcarbamoyl-3-(3-trifluoromethylphenyl)pyrrolidine | 7 | 0.22 | 0.21 | 0.21 | 0.22 | 0.20 | 0.24 | 0.24 | 0.23 | 0.21 | 0.24 |
| | 8 | 0.20 | 0.16 | 0.20 | 0.20 | 0.20 | 0.16 | 0.22 | 0.22 | 0.20 | 0.20 | a 400 mg. methocarbamol per ml. of solution.

TABLE VII.—EFFECT OF DAILY INTRAVENOUS INJECTIONS OF DIMETHYLISOSORBIDE SOLUTIONS OF MUSCLE RELAXANTS ON BODY WEIGHT

| Treatment | Dog Number | Body weight in kilograms | | | | | | | | | | | | |
|---|---|---|---|---|---|---|---|---|---|---|---|---|---|---|
| | | −5 days | −3 days | 0 day | 1 day | 2 days | 3 days | 4 days | 7 days | 8 days | 9 days | 10 days | 11 days |
| Control Dimethylisosorbide | 5 | 10.3 | 10.1 | 9.9 | 9.9 | 10.0 | 10.2 | 10.0 | 9.8 | 9.8 | 10.1 | 9.9 | 9.9 |
| | 6 | 11.8 | 11.8 | 11.4 | 11.3 | 11.3 | 11.0 | 10.7 | 10.5 | 10.5 | 10.4 | 10.3 | 10.2 |
| Methocarbamol | 2 | 8.3 | 8.3 | 8.5 | 8.1 | 8.6 | 8.4 | 8.3 | 8.1 | 8.1 | 8.3 | 8.4 | 8.4 |
| | 3 | 10.7 | 10.3 | 9.9 | 9.6 | 9.6 | 8.9 | 9.7 | 9.5 | 9.5 | 8.7 | 8.3 | 8.2 |
| Meprobamate | 4 | 13.1 | 13.2 | 13.1 | 12.8 | 12.6 | 12.9 | 13.5 | 12.6 | 12.6 | 13.0 | 12.8 | 12.9 |
| | 1 | 12.0 | 11.8 | 11.8 | 11.7 | 11.7 | 11.7 | 12.0 | 11.5 | 11.7 | 11.9 | 11.8 | 11.4 |
| 1-ethylcarbamoyl-3-(3-trifluoromethylphenyl) pyrrolidine | 7 | 10.4 | 10.3 | 10.1 | 9.7 | 9.7 | 9.5 | 9.2 | 9.2 | 9.2 | 9.6 | 9.5 | 9.6 |
| | 8 | 10.5 | 10.3 | 10.3 | 10.0 | 10.0 | 10.0 | 9.9 | 10.0 | 10.0 | 10.0 | 10.1 | 9.9 |

TABLE VIII.—CLINICAL CHEMISTRY VALUES FOR DOGS AFTER DAILY INTRAVENOUS INJECTIONS OF MUSCLE RELAXANT SOLUTIONS IN 75% DIMETHYLISOSORBIDE

[Modified Reitman-Frankel method, units of activity/ml.]

| Treatment | Dog Number | Serum glutamic oxalacetic transaminase (SGO-T) (days) | | | | | | | | Serum glutamic pyruvic transaminase (SGP-T) (days) | | | | | | | |
|---|---|---|---|---|---|---|---|---|---|---|---|---|---|---|---|---|---|
| | | (−5) | (−3) | (1) | (2) | (3) | (4) | (7) | (9) | (11) | (−6) | (−3) | (1) | (2) | (3) | (4) | (7) | (9) | (11) |
| Control Dimethyl isosorbide | 5 | 20 | 29 | 16 | 24 | 24 | 21 | 32 | 35 | 36 | 16 | 18 | 15 | 9 | 18 | 12 | 15 | 10 | 10 |
| | 6 | 24 | 47 | 28 | 19 | 27 | 28 | 39 | 37 | 38 | 12 | 20 | 20 | 17 | 16 | 17 | 22 | 16 | 16 |
| Methocarbamol | 3 | 22 | 34 | 22 | 36 | 44 | 46 | 41 | 48 | 49 | 25 | 30 | 47 | 43 | 34 | 29 | 25 | 25 | 25 |
| | 4 | 25 | 44 | 19 | 28 | 29 | 32 | 32 | 37 | 27 | 12 | 18 | 17 | 22 | 16 | 17 | 15 | 17 | 22 |
| Meprobamate | 1 | 21 | 27 | *67 | 32 | 27 | 28 | 17 | 31 | 25 | 27 | 24 | 33 | 30 | 23 | 30 | 32 | 24 | 16 |
| | 7 | 47 | 49 | 66 | 28 | 27 | 36 | 32 | 33 | 38 | 23 | 34 | 28 | 35 | 22 | 21 | 29 | 24 | 24 |
| 1-ethylcarbamoyl 3-(3-trifluoromethylphenyl)-pyrrolidine | 7 | 36 | 36 | 46 | 36 | 36 | 36 | 24 | 35 | 40 | 15 | 22 | 19 | 32 | 21 | 16 | 17 | 10 | 7 |
| | 8 | 14 | 18 | 14 | 15 | 14 | 16 | 16 | 22 | 16 | 12 | 18 | 19 | 17 | 15 | 12 | 17 | 12 | 5 |

*Hemolyzed.

What is claimed is:

1. A pharmaceutical composition useful for its muscle relaxant properties comprising a solution of a muscle relaxant drug in dimethylisosorbide.

2. A composition of claim 1 wherein the muscle relaxant drug is metaxalone.

3. A composition of claim 1 wherein the muscle relaxant drug is methocarbamol.

4. A composition of claim 1 wherein the muscle relaxant drug is meprobamate.

5. A composition of claim 1 wherein the muscle relaxant drug is 1-ethylcarbamoyl-3-(3-trifluoromethylphenyl)pyrrolidine.

6. A pharmaceutical composition useful for its muscle relaxant properties comprising a solution of a muscle relaxant drug in a solvent system comprising dimethylisosorbide and water wherein the amount of water is from 10 to 50 volume per cent and the amount of dimethylisosorbide is from 90 to 50 volume per cent.

7. A composition of claim 6 wherein the muscle relaxant drug is methocarbamol.

8. A composition of claim 6 wherein the muscle relaxant drug is meprobamate.

9. A composition of claim 6 wherein the muscle relaxant drug is 1-ethylcarbamoyl-3-(3-trifluoromethylphenyl)pyrrolidine.

10. A process which comprises administering to a living animal body for its muscle relaxant effect an effective amount of a composition of claim 1.

11. A process which comprises administering to a living animal body for its muscle relaxant effect an effective amount of a composition of claim 6.

* * * * *